Patented June 2, 1936

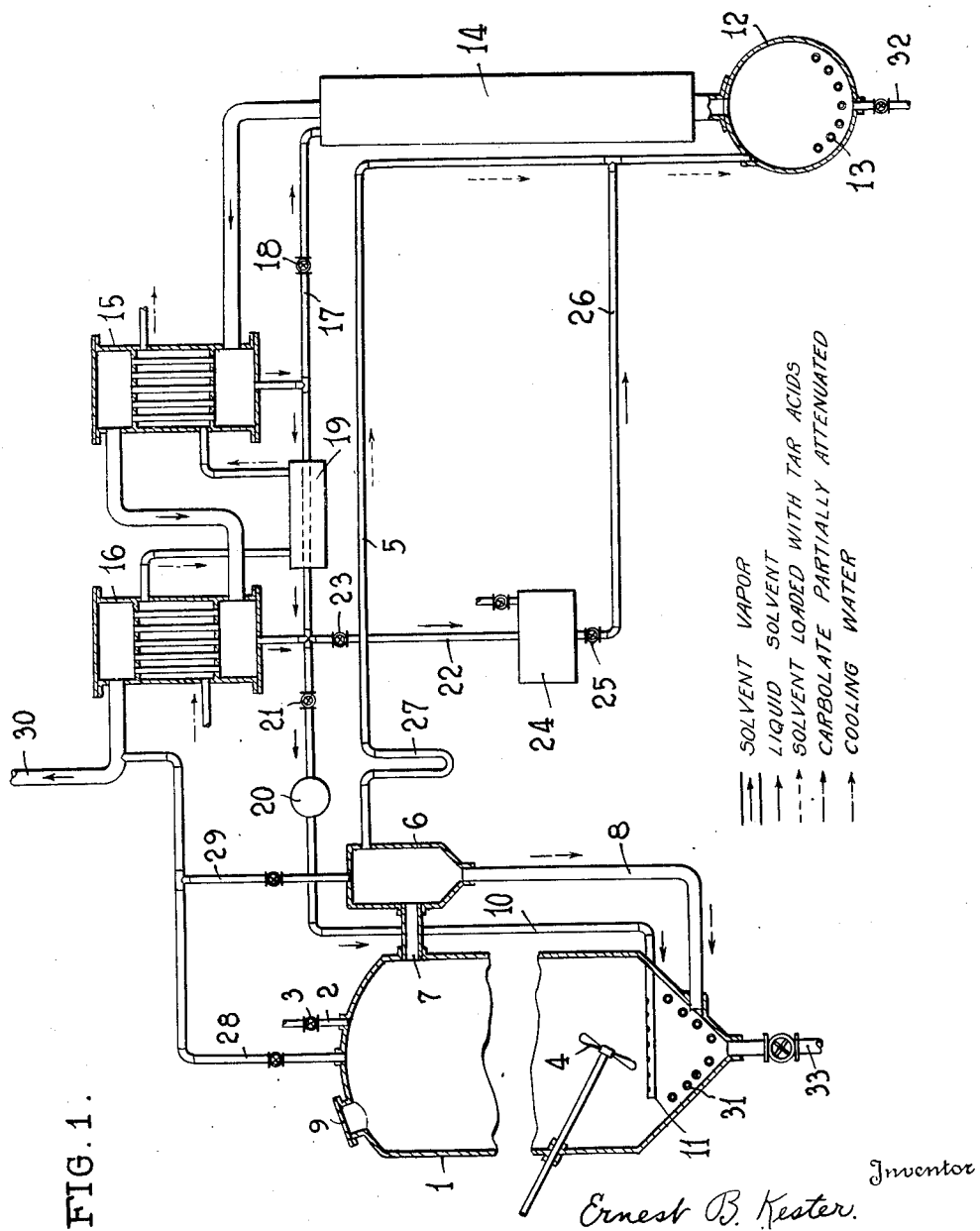

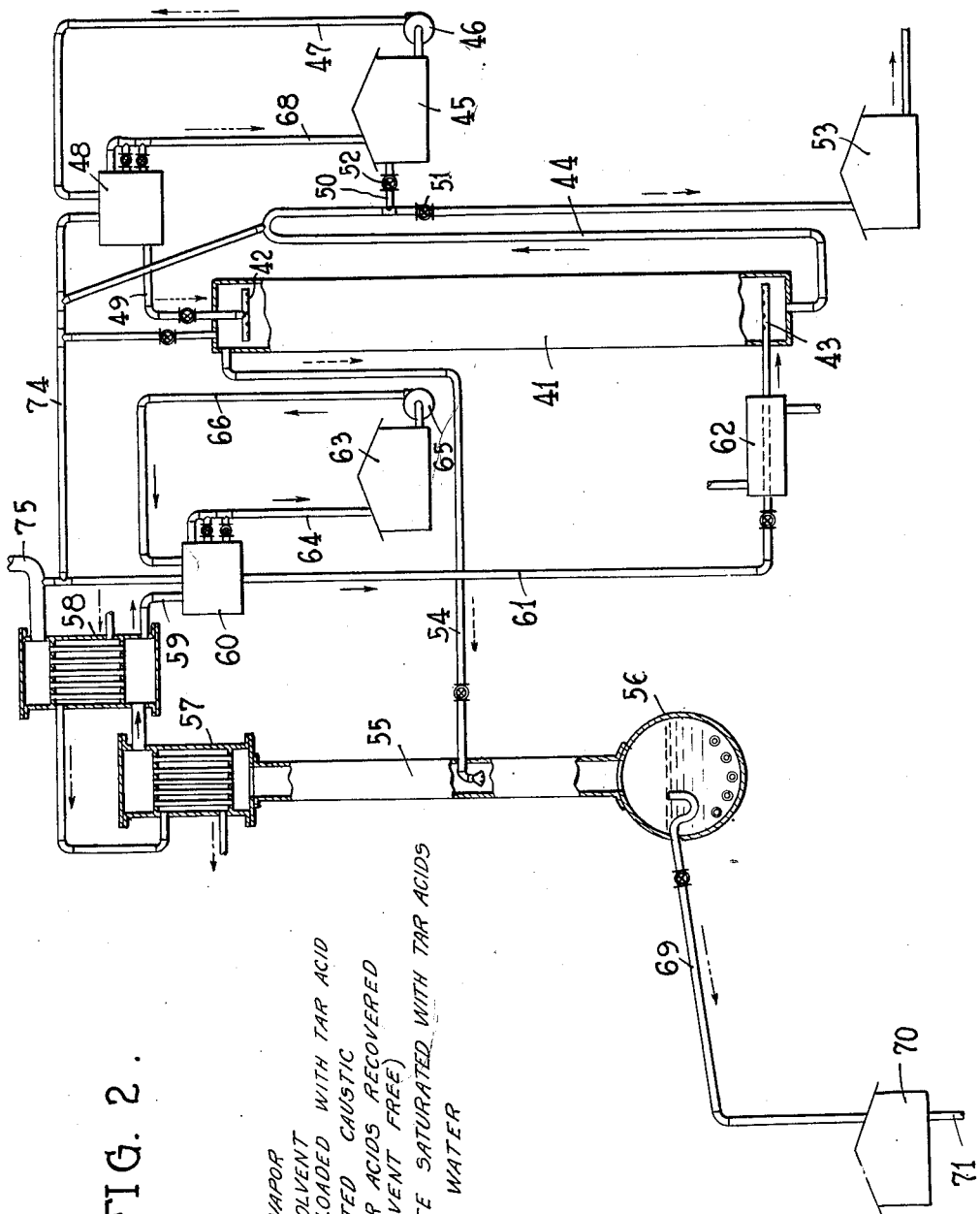

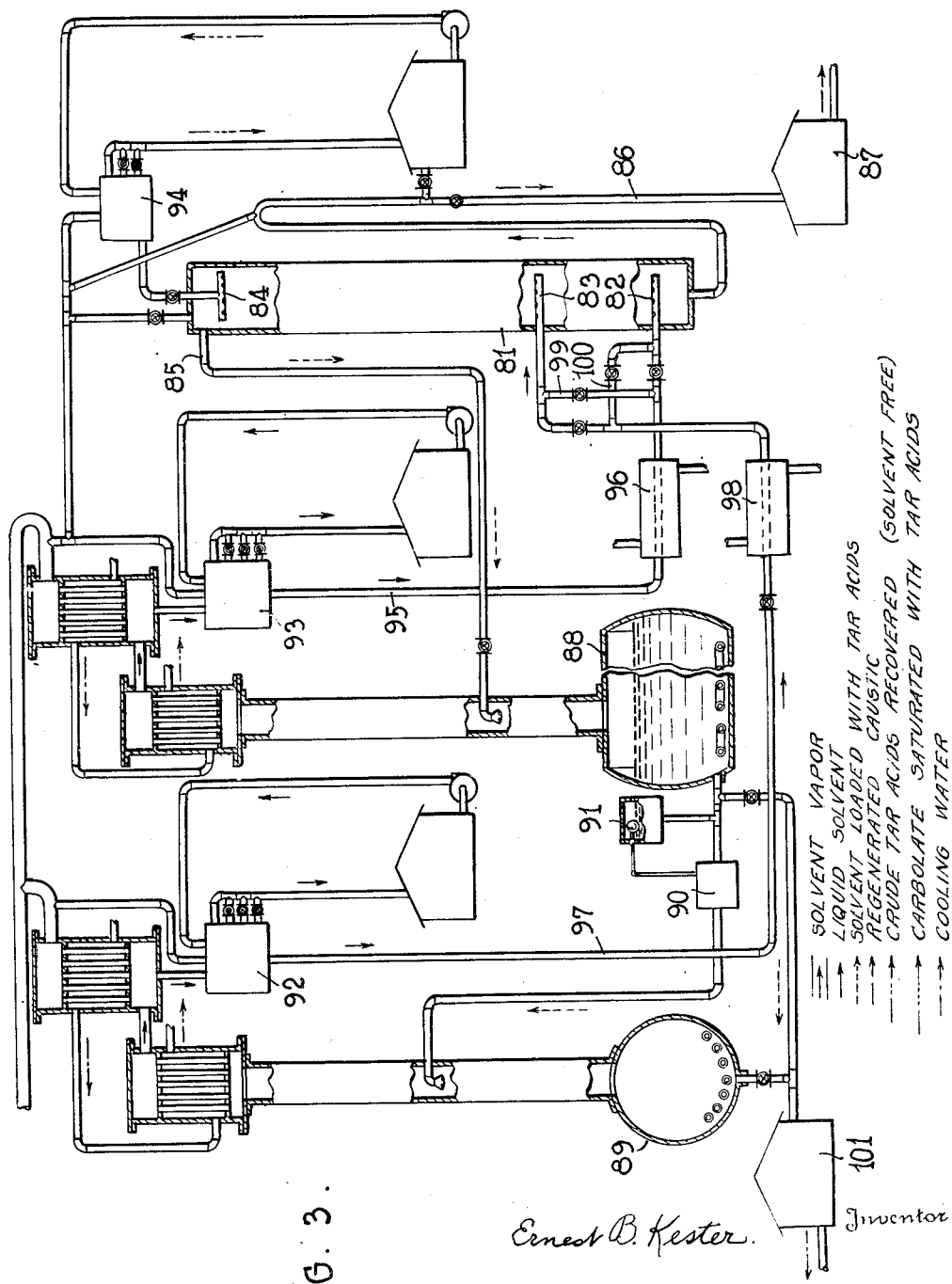

2,043,102

UNITED STATES PATENT OFFICE 2,043,102

PROCESS OF PRODUCING PHENOLS

Ernest B. Kester, Pittsburgh, Pa., assignor, by mesne assignments, to Koppers Gas and Coke Company, a corporation of Delaware Application March 26, 1934, Serial No. 717,523

33 Claims. (Cl. 260—154)

This invention relates to improvements in processes of producing phenols or so-called tar acids, and more particularly to the treatment of solutions of phenolates (tar acid salts) under such conditions that phenols may be efficiently and economically extracted from such solutions.

In the production of tar acids from coal tar, it has been customary to extract tar acids from the tar acid oil fraction by means of caustic soda solution and then to treat the resulting phenolate solution, separated from the unreacted oil, with a mineral acid or carbon dioxide gas to "spring" the phenols. The free phenols or tar acids, and the sodium carbonate solution formed when carbon dioxide is employed, are separated, and from the carbonate solution sodium hydroxide is regenerated for further use in the extraction process. If a mineral acid neutralization process is employed, the sodium is lost from further usefulness.

The regeneration of sodium hydroxide from sodium carbonate that is generally practiced in tar acid plants increases production costs to such an extent that the elimination of the caustic soda regeneration system has become a matter of considerable importance. As is well known, the sodium carbonate solution obtained in "springing" phenolates, is treated in causticizers with lime coming from a lime-kiln used for burning limestone and for generating carbon dioxide. The caustic soda solution from the causticizers must then be filtered to remove calcium carbonate before the solution is employed for extracting tar acids. The equipment, including "springing" tanks, causticizers, kilns, and filter presses, required in plants employing the above prior process, is relatively costly to install and to operate. The existing process is further encumbered by the necessity for disposing of the calcium carbonate from the causticizers.

In the process of the present invention the use of carbon dioxide gas in the treatment of phenolates is avoided and therefore the equipment mentioned above is unnecessary. Alkaline solutions are employed to convert phenols into phenolates but the alkaline reagent is regenerated directly from the phenolate solution treated. No carbon dioxide or mineral acid is used for this purpose. The process is so conducted that losses of reagents employed are practically negligible. Moreover, all materials used are handled conveniently in the liquid or gaseous phases. No problem in waste disposal is involved.

The present invention comprises bringing together a solvent and phenolate solution for the purpose of extracting phenols from the latter, and for separating the resulting solution of phenol material from regenerated alkaline material originally employed in combining with phenols present in tar or other oils. The phenolic material is separated from the solvent by fractional distillation and such solvent is re-used in extracting additional phenolic material. The regenerated alkaline material is reused for the formation of phenolates from additional phenol-containing oils.

As will be seen, in the present process advantage is taken of the insolubility of the alkaline reagents employed, in certain liquid solvents, (and vice versa), and of the tendency of phenolates to hydrolyze. An example of such hydrolysis may be represented by the equation:

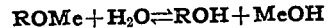

$$ROMe + H_2O \rightleftharpoons ROH + MeOH$$

wherein Me is a symbol for the positive radical of a base-forming material. It has been found that phenols are readily extractable by virtue of this hydrolysis from aqueous sodium hydroxide, for instance, by means of immiscible solvents such as ether or benzol to any attenuation desired. In a phenolate solution, such phenol as is formed due to hydrolysis is partitioned between the two liquid layers, namely between the aqueous phenolate solution and the immiscible solvent. In view of this, thorough emulsification or intimate contact of the liquids in an extraction chamber is exceedingly advantageous and tends towards improved extraction. As fresh solvent enters the extraction chamber, loaded solvent is separated from the mixture or emulsion and removed from the chamber, to be recovered for recycling from the free phenolic material. Under these conditions the equilibrium represented by the above equation tends to be disturbed by the removal of one of the reactants, namely, the free phenolic material so that more of the latter is continuously formed until extraction is substantially complete.

Certain measures may be taken to increase the hydrolysis of phenolate solutions and to accelerate the rate of removal of phenolic material from caustic solutions:

(1) Increase in temperature in the extraction chamber promotes hydrolysis and has an accelerating effect on the removal of the phenols. On a volume basis, isopropyl ether for instance, is inferior to ethyl ether in the present process under the same conditions of temperature. An increase of temperature, however, accelerates the extraction so decidedly that the two ethers may be compared favorably close to their normal boiling points. The higher temperature permissible in the case of isopropyl ether (B. Pt. 69° C.) augments the power of this solvent until it is superior to ethyl ether on the mole basis at temperatures usable for each without resort to pressure equipment.

When the extraction is carried on at higher temperatures the temperature is preferably maintained below the boiling point of the solvent. Pressure may be used to raise the normal boiling point to obtain the advantage of increased temperature.

(2) Dilution of the phenolate solution to be treated, likewise promotes hydrolysis and has an accelerating effect on the removal of phenols, other conditions being equal. As a step in the present process, a phenolate solution of given concentration may be diluted to increase hydrolysis and in turn the rate of removal of phenols. For example, the use of a caustic strength of 2.5 normality results in a distinct advantage in speed of extraction over caustic of 5.0 normality. By the same token, the use of caustic of 1.5, 1.0, or 0.5 normality, results in increases in speed of extraction in the order of the decrease in normality.

Various solvents or combinations of solvents may be used in the present process. It is preferable to use what are herein termed immiscible solvents, namely, solvents that are, practically speaking, immiscible with the phenolate solution treated. Examples of immiscible solvents are benzene, toluene and ligroin. Besides immiscible solvents, partially miscible solvents may be used. Examples of partially miscible solvents are hexone, ether and isopropyl ether. The above solvents are used separately or in combinations of two or more. A solvent completely miscible with the phenolate may be used provided an immiscible or partially miscible solvent is used in conjunction with it that will yield a two-layer system. The solvent layer should be substantially free from the base-forming material at all times during the extraction.

In selecting a combination of solvents at least one should be either immiscible or only partially miscible. Combinations that are satisfactory are acetone and benzene; ether and toluene; isopropyl ether and toluene; ether, acetone and benzene.

The presence of an organic base in a solvent, renders it exceedingly efficient. Pyridine, picolines or piperidine are suitable. In addition to the presence of these in the solvent, they may be also added to the phenolate to great advantage. When approximately one equivalent of an organic base was added to the phenolate solution and the same base was present to the extent of 50% in the solvent, excellent results were obtained. Any proportion of base may be used in either the phenolate solution or the solvent within practical limits.

It is known that organic bases form compounds or addition products with phenols, a fact which doubtless accounts for the greater readiness with which phenols are removed from caustic solutions in the presence of an organic base either as an adjunct to the phenolate solution, or as a constituent of the solvent or both.

Ordinarily it is more advantageous to employ solvents that have lower boiling points than any of the uncombined phenols extracted. It is possible, however, to employ solvents such as benzophenone (B. Pt. 306° C.) or dibenzyl ether (B. Pt. 295.8° C.) having boiling points higher than the boiling points of the phenols extracted.

The materials treated in the present process for the recovery of phenols are essentially hydrocarbon oils containing the same. The chief source of tar acids is coal tar from either high or low temperature carbonization. The tar acid oil fraction separated by distillation contains constituents having a boiling point range up to substantially 270° C. However a tar acid oil fraction having a higher end boiling point may be treated if desired.

Mineral oils are frequently treated with phenols to improve their properties. This is particularly true of lubricating oils. Phenolates produced by the recovery of phenols used in such processes may be treated by the process of the present invention.

The strength of the caustic soda solution used in extracting tar acid oils should be such that a separation of the aqueous from the non-aqueous layer is readily obtained. Ordinarily a 9.5% solution is employed, in a tar acid plant. An excess of caustic over and above the amount required to neutralize the tar acids present in the oil, should be avoided as such excess tends to retard the subsequent extraction by solvents.

Other alkaline materials besides caustic soda solution may be employed in the extraction of phenols from oils. In general, alkali, akaline earth, magnesium and ammonium hydroxides, and alkali sulfides may be used as alkaline materials in the present process.

The present invention is not concerned with extraction of phenols from industrial liquors. The latter involves problems that are foreign and distinct from the problems that are involved in the present process.

In the description of the present invention, the term "phenol" is used in its broad sense as distinguished from benzophenol, (carbolic acid, $C_6H_5OH$) and includes hydroxylated benzenoid substances in general. "Phenolate" is used to designate salts of the so-called phenols or phenols combined with the positive radical of a base.

Phenolic substances varying in structure and molecular weight are extractable from caustic solutions at different rates under identical conditions, the rates being specific for each chemical compound under the conditions used. Ortho substituted phenols, for instance, are more readily removed than are the corresponding meta- and para-compounds. Meta- and para-cresol behave substantially identically under the same conditions. Increase in molecular weight tends to increase the rapidity with which phenols may be removed from caustic solutions, but this effect may be mitigated or inhibited altogether by the influence of structure. The simple phenols such as benzophenol and the two naphthols are more difficult to extract from caustic solutions than are the alkyl substitution products of benzophenol.

The present process may be illustrated by referring to drawings of the apparatus in which the process may be conducted. The construction and arrangement of the parts of the apparatus will be readily understood from the description of the operation thereof. Reference is therefore made to the accompanying drawings in which:

Fig. 1 is a partially diagrammatic view, partly in elevation and partly in vertical section, of one modification of apparatus suitable for the practice of my present invention;

Fig. 2 is a partially diagrammatic view, partly in elevation and partly in vertical section, of another modification of the apparatus; and Fig. 3 is a similar view of still another modification.

A phenolate solution derived from the oil treatment processes described above is introduced into a vessel 1 (Fig. 1) through a pipe 2 provided with a valve 3. The upper level of the phenolate solution should preferably reach above the stirrer 4. The balance of the vessel is filled with solvent material, of the type mentioned above, until its upper level is as high as the overflow pipe 5 leading from the settling chamber 6 that is connected to an upper section of the vessel 1 by means of a pipe 7, and to a lower section by means of a pipe 8. The solvent may be initially introduced through a manhole 9 or any other suitable means. The stirrer 4 is rotated and fresh solvent is continuously introduced at the bottom of the vessel 1 through a pipe 10 provided at its end with any type of distributor means such as perforated pipe section 11 for injecting the solvent into the phenolate solution preferably in finely comminuted condition. During the extraction process the solvent is supplied as a condensate from a still 12 used for separating the extracting medium from extracted phenolic material.

The still 12 is provided with any suitable heating means such as a steam coil 13 and with a fractionating column or rectifier 14. Vapors from the rectifier 14 pass into the partial and final condensers 15 and 16 respectively. The condensate from condenser 15 is drawn off through a pipe 17 and may be returned in whole or in part to the column 14 as reflux by opening a valve 18. Or, by closing the valve 18 the condensate from condenser 15 is led through a cooler 19 and is brought together with the condensate from condenser 16 and led to the vessel 1 through the pipe 10 and distributor 11.

The entire apparatus is so designed that fresh solvent at a controlled rate is delivered to and thoroughly agitated with the phenolate solution. The apparatus shown in Fig. 1 is substantially of the type used for laboratory research heretofore disclosed by me ("Industrial and Engineering Chemistry" Vol. 24, pages 1121 to 1125, October, 1932) and from which has evolved the present form for use in production on a commercial scale. The rate of flow is determined by means of a flow meter 20 and is controlled by a valve 21. Any suitable means may be provided to prevent flooding of the condensers. Excess solvent condensate may be withdrawn from the circulatory system through a pipe 22 connected to pipe 10, by opening a valve 23. The pipe 22 leads to a reservoir tank 24 from whence solvent may be introduced into the system by opening a valve 25 in a pipe 26 leading to the still 12.

The solvent entering vessel 1 through the distributor 11 is thoroughly emulsified with the phenolate solution. If desired, agitation may be accomplished by injecting an inert gas into the body of liquid in place of using a mechanical stirrer, or, both means may be combined. Contact between the solvent and phenolate solution may be further improved by providing packing (not shown) in the vessel. This may be omitted, however. The packing when provided above the stirrer 4, also assists in breaking the emulsion as it rises in the vessel 1.

While solvent is being fed into vessel 1 at the bottom, the solution of phenolic material overflows through pipe 7 into the settling chamber 6 and then through pipe 5 into the still 12. Any emulsion that rises and passes into chamber 6 where it is free from agitating influences, separates into layers, the attenuated phenolate solution settling to the bottom and flowing back into the vessel 1 through pipe 8. A trap 27 in pipe 5 insures one-way flow of liquid.

Vents 28 and 29 are provided for vessel 1 and chamber 6 respectively. These should be open to the atmosphere preferably by way of a pipe connection to the vent 30 of the final condenser 16. If desired, a vacuum pump (not shown) may be connected to the vent 30. The precaution is taken to prevent carbon dioxide from entering the system. This is done by providing a soda lime chamber (not shown) in the line 30.

As stated above the extraction in vessel 1 is improved by increasing the temperature. For heating purposes a steam coil 31 is provided. By forcing solvent into vessel 1 under pressure and by hermetically sealing it, a super-atmospheric pressure is developed throughout, by means of which the normal boiling point of the solvent may be raised, thereby permitting the use of higher temperatures. Under these conditions a pressure-reducing valve may serve to release phenolic solution from settling chamber 6.

The speed of stirring is maintained at a rate sufficient to ensure intimate mixture of the two liquids and to permit complete separation in settling chamber 6 of the emulsion formed.

At suitable intervals, the extracted phenol material is withdrawn from the still 12 through a draw-off pipe 32. If desired, the solvent may be removed from the extracted phenol in the still 12 or it may be removed in a separate distillation apparatus. To accomplish removal of solvent in still 12 the valves 21 and 25 may be temporarily closed and valve 23 opened. Reflux to improve fractionation is obtained by control of valve 18.

Attenuated phenolate solution (or regenerated caustic solution) is withdrawn from the vessel 1 through a drain pipe 33. Before withdrawal, valve 21 is closed, agitation stopped, and the regenerated caustic solution permitted to settle. The caustic solution withdrawn is used for extraction of fresh tar acid oils.

The apparatus shown in Fig. 1 is designed primarily for batch extraction in which single or multiple solvents may be employed. The series condensers 15 and 16 provide for proper cooling and condensation of vapors in cases where a plurality of solvents are employed having different boiling points.

An example of apparatus that may be used in carrying on a continuous extraction process with counter-current flow is illustrated in Fig. 2.

A tower 41 preferably tall and narrow, provided either with or without packing, or baffles or bell trays, is charged with solvent that enters through a perforated pipe 43 positioned in the lower portion of the tower. The upper level of the solvent is kept above a perforated pipe 42 through which phenolate solution is introduced into the upper portion of the tower. The phenolate solution in passing downwardly through the column of solvent, becomes attenuated with respect to phenolic material while the upward rising solvent becomes more highly charged therewith. The more concentrated phenol solution comes into contact with the more highly concentrated phenolate solution entering through pipe 42, and the fresh solvent entering through pipe 43 comes into contact with the less concentrated phenolate solution in the lower portion of the column. Attenuated phenolate solution is withdrawn from the bottom of the tower 41 through the seal 44 or other means for maintaining a level of phenolate solution below pipe 43.

Phenolate solution to be treated with solvent is pumped from a storage tank 45 by means of a pump 46 through a pipe 47 into a constant head feed tank 48. From the feed tank, the phenolate solution flows through a pipe 49 to the perforated pipe 42. Phenolate solution that is not sufficiently attenuated is withdrawn from the pipe 44 through a pipe 50 leading to the storage tank 45. By keeping the valve 51 shut and the valve 52 open the phenolate solution may be repeatedly circulated through the tower 41, or if desired, the partially attenuated phenolate solution may be passed into a second tower similar to 41 for further extraction. Regenerated alkaline solution is passed to a storage tank 53 by opening valve 51. From the storage tank the regenerated alkaline solution is piped to the tar acid oil treating plant (not shown).

The solution of phenolic material in solvent is withdrawn from the tower 41 adjacent the top thereof, preferably above the level of the perforated pipe 42, through a pipe 54. The phenol solution is now treated to recover the solvent therefrom for reuse in the extracting tower. The phenol solution is sprayed into a fractionating column 55 on a still 56. The solvent vapors rise through the dephlegmator 57 and pass into a final condenser 58. Condensed solvent passes from the condenser 58 through a pipe 59 into a constant head feed tank 60 from whence it is conducted through a pipe 61 to the perforated pipe 43 in the extracting tower 41. Extraction is improved by preheating the solvent in a preheater 62. The solvent is preferably heated no higher than its normal boiling point unless provision is made for the use of pressure.

The rates of feed of solvent and of phenolate solution are controlled or maintained constant by means of the constant head feed tanks 60 and 48 respectively. To increase the rate of feed, the level of overflow of solvent in tank 60 is raised by closing valves in the take-offs at various levels in the side of the tank. To decrease the rate, valves in the take-offs are opened to permit overflow at a lower level into the solvent storage tank 63 through a pipe 64. The tank 60 is kept supplied with solvent from the condenser 58, and from tank 63 by means of a pump 65 pumping solvent through a return-pipe 66. The constant head feed tank 48 is operated in a manner similar to that of operating tank 60. In other words, the phenolate solution in tank 48 overflows at the desired level into tank 45 through a pipe 68 and is pumped back through pipe 47.

The phenol overflows from the still 56 through a pipe 69 into a storage tank 70 from which it may be removed through line 71 to a refining plant.

A vent manifold 74 is connected to the tank 48, the tower 41, the upper bend of the pipe 44, and the tank 60. The manifold 74 leads to the vent 75 on the condenser 58. Vent 75 may be open to the atmosphere or connected to a vacuum pump (not shown); but preferably the vent is connected to a soda lime chamber (not shown) to remove carbon dioxide from air that is likely to gain access into the extraction apparatus.

As indicated above a combination of solvents used for extracting phenols from phenolate solutions frequently gives better results than a single solvent. A method and apparatus in which a combination of solvents is used, are briefly described below by way of further illustration of the present invention. Reference is now made to Fig. 3.

A tower 81 preferably tall and narrow and similar to that shown in Fig. 2, is charged with solvent. The piping for the return of solvent material to the tower 81 is so arranged as to provide for injection of individual solvents separately at separate points and at different levels or the solvents may be introduced together at one point. The arrangement shown is particularly useful when employing a mixture containing at least one partially or wholly miscible solvent as for instance the combinations pointed out above. The partially or wholly miscible solvent used must have a boiling point different from that of the other solvent or solvents as well as from that of the phenolic material extracted, if they are to be introduced separately.

Solvent may be introduced into tower 81 through a perforated pipe 82 at a lower level therein or through a perforated pipe 83 at a higher level. The phenolate solution is introduced through a perforated pipe 84 adjacent the top of the column. Extracted phenol solution overflows through a pipe 85, and attenuated phenolate solution is withdrawn from the bottom of the tower 81 through a seal 86 and is passed into a second extraction tower (not shown) or into a storage tank 87, or is recirculated through the one tower as set forth in connection with the apparatus shown in Fig. 2.

The tower 81 may be provided with packing above the perforated pipe 83 and also between the latter and pipe 82. The portion of the tower between pipe 82 and pipe 83 serves as a stripping section.

By way of example, if a mixture of pyridine and benzene is employed as the extracting medium, the benzene is fed through perforated pipe 82 and the pyridine through perforated pipe 83. In general, the least valuable or least miscible solvent is fed in at a lower level and the most valuable or most miscible at an upper level. Any pyridine that travels downwardly with the phenolate solution is removed from the latter by the benzene which prevents withdrawal of pyridine with the attenuated phenolate solution at the bottom of the tower.

The solution of phenolic material is subjected to fractional distillation in a still 88 to remove benzene, and then in a still 89 to remove pyridine. A pump 90 controlled by a float mechanism 91, pumps phenolic solution freed from benzene into the fractionating column for still 89. Suitable condensers are provided as in the apparatus in Fig. 2. Constant head feed tanks 92, 93, and 94 are provided for pyridine, benzene and phenolate solution respectively and are operated in a manner similar to that set forth with respect to the feed tanks described in connection with the apparatus shown in Fig. 2.

Benzene is returned to the tower 81 through a pipe 95 and a preheater 96. Pyridine is returned to the tower through a pipe 97 and a preheater 98. By means of the piping 99 and 100 connecting pipes 95 and 97, and the valves therein, it is seen that the solvents may be directed into the tower as desired.

Extracted phenols are collected in the storage tank 101.

With proper reconstruction, towers of the type shown in Fig. 2 and Fig. 3 may be adapted to processes in which solvent and phenolate solution are passed through concurrently instead of countercurrently. Also, proper changes in pipe connections are made if the solvent is fed in at the top, phenolate at the bottom, the phenol solution being withdrawn from the bottom and the attenuated phenolate from the top, particularly in cases where the specific gravity of the solvent is greater than that of the phenolate solution.

Phenolate solutions derived from tar oils may be subjected to a preliminary purification before placing in the extraction chamber. Benzene or steam, for instance, may be used to remove any tarry matter or non-phenolic substances present in such phenolate solutions.

It is thought that the invention and many of its attendant advantages will be understood from the foregoing description and accompanying drawings, and it will be apparent that various changes may be made in the form, construction and arrangement of parts without departing from the spirit and scope of the invention or sacrificing all of its material advantages, the forms hereinbefore cited by way of illustration being merely the preferred embodiments thereof.

What I claim is:—

1. A process comprising contacting alkali metal phenolate solution and liquid solvent material selected from a group consisting of solvent material immiscible with the phenolate solution and solvent material partially miscible with said phenolate solution, the said solvent material having a solvent action on phenol and having a boiling range substantially different from that of the phenolic material of the said phenolate in its uncombined state, removing free phenolic material by means of said solvent material from said phenolate solution and continuing the removal until a major portion of the phenolate has been converted into uncombined phenolic material abstracted by solvent, and separating from the solvent for said phenolate the solution of free phenolic material thus formed.

2. A process comprising removing phenolic material from hydrocarbon oil containing the same by means of a solution of alkaline alkali metal compound to form alkali metal phenolate solution, contacting the said phenolate solution and liquid solvent material selected from a group consisting of solvent material immiscible with the phenolate solution and solvent material partially miscible with said phenolate solution, the said solvent material having a solvent action on phenol and having a boiling range substantially different from that of the phenolic material of the said phenolate in its uncombined state, removing free phenolic material by means of said solvent material from said phenolate solution and continuing the removal until a major portion of the phenolate has been converted into uncombined phenolic material abstracted by solvent, and separating from the solvent for said phenolate the solution of free phenolic material thus formed.

3. A process comprising contacting alkali metal phenolate solution and liquid solvent material selected from a group consisting of solvent material immiscible with the phenolate solution and solvent material partially miscible with said phenolate solution, the said solvent material having a solvent action on phenol and having a boiling range substantially different from that of the phenolic material of the said phenolate in its uncombined state, removing free phenolic material by means of said solvent material from said phenolate solution and continuing the removal until a major portion of the phenolate has been converted into uncombined phenolic material, and separating from the solvent for said phenolate the solution of free phenolic material thus formed, and separating the phenol solvent from the solution of phenol material by fractional distillation.

4. A process comprising removing phenolic material from hydrocarbon oil containing the same by means of a solution of alkaline material to form phenolate solution, contacting phenolate solution and liquid solvent material selected from a group consisting of solvent material immiscible with the phenolate solution and solvent material partially miscible with said phenolate solution, the said solvent material having a solvent action on phenol and having a boiling range substantially different from that of the phenolic material of the said phenolate in its uncombined state, removing free phenolic material by means of said solvent material from said phenolate solution and continuing the removal until a major portion of the phenolate has been converted into uncombined phenolic material, and separating from the solvent for said phenolate the solution of free phenolic material thus formed, and separating the phenol solvent from the solution of phenol material by fractional distillation.

5. A process comprising removing phenolic material from hydrocarbon oil containing the same by means of a solution of alkaline material to form phenolate solution, contacting phenolate solution and a mixture of liquid solvents selected from a group consisting of solvent material immiscible with the phenolate solution and solvent material partially or wholly miscible with said phenolate solution, the said solvent mixture having a solvent action on phenol and having a boiling range substantially different from that of the phenolic material of the said phenolate in its uncombined state, removing free phenolic material by means of said solvent mixture from said phenolate solution and continuing the removal until a major portion of the phenolate has been converted into uncombined phenolic material, and separating from the solvent for said phenolate the solution of free phenolic material thus formed.

6. A process comprising contacting phenolate solution and a mixture of liquid solvents selected from a group consisting of solvent material immiscible with the phenolate solution and solvent material partially or wholly miscible with said phenolate solution, the said solvent mixture having a solvent action on phenol and having a boiling range substantially different from that of the phenolic material of the said phenolate in its uncombined state, removing free phenolic material by means of said solvent mixture from said phenolate solution and continuing the removal until a major portion of the phenolate has been converted into uncombined phenolic material, and separating from the solvent for said phenolate the solution of free phenolic material thus formed.

7. A process comprising contacting phenolate solution and a liquid solvent mixture at least one component of which comprises solvent material selected from a group consisting of solvent material immiscible with the phenolate solution and solvent material partially or wholly miscible with said phenolate solution, the solvents in said solvent mixture having a solvent action on phenol and having boiling ranges substantially different from that of the phenolic material of the said phenolate in its uncombined state, removing free phenolic material by means of said solvent mixture from said phenolate solution and continuing the removal until a major portion of the phenolate has been converted into uncombined phenolic material abstracted by solvent, and separating from the solvent for said phenolate the solution of free phenolic material thus formed.

8. A process comprising contacting alkali metal phenolate solution and liquid solvent material selected from a group consisting of solvent material immiscible with the phenolate solution and solvent material partially miscible with said phenolate solution, the said solvent material having a solvent action on phenol and having a boiling range substantially different from that of the phenolic material of the said phenolate in its uncombined state, removing free phenolic material by means of said solvent material from said phenolate solution and continuing the removal until a major portion of the phenolate has been converted into uncombined phenolic material, and separating from the solvent for said phenolate the solution of free phenolic material thus formed, and separating the phenol solvent from the solution of phenol material by fractional distillation and re-using the separated phenol solvent in contacting with phenolate solution.

9. A process comprising removing phenolic material from hydrocarbon oil containing the same by means of a solution of alkaline material to form phenolate solution, contacting phenolate solution and liquid solvent material selected from a group consisting of solvent material immiscible with the phenolate solution and solvent material partially miscible with said phenolate solution, the said solvent material having a solvent on phenol and having a boiling range substantially different from that of the phenolic material of the said phenolate in its uncombined state, removing free phenolic material by means of said solvent material from said phenolate solution and continuing the removal until a major portion of the phenolate has been converted into uncombined phenolic material, and separating from the solvent for said phenolate the solution of free phenolic material thus formed, and separating the phenol solvent from the solution of phenol material by fractional distillation and re-using the separated phenol solvent in contacting with phenolate solution.

10. A process comprising removing phenolic material from hydrocarbon oil containing the same by means of a solution of alkaline material to form phenolate solution, contacting the said phenolate solution and liquid solvent material selected from a group consisting of solvent material immiscible with the phenolate solution and solvent material partially miscible with said phenolate solution the said solvent material having a solvent action on phenol and having a boiling range substantially different from that of the phenolic material of the said phenolate in its uncombined state, removing free phenolic material by means of said solvent material from said phenolate solution and continuing the removal until a major portion of the phenolate has been converted into uncombined phenolic material, separating the phenol solution from the solution of phenol material thus formed by fractional distillation, re-using the separated solvent in contacting phenolate solution to remove phenolic material, and re-using alkaline solution regenerated in the removal of phenolic material from hydrocarbon oil containing the same.

11. In a process for extracting tar acid material from phenolate solution, agitating a mixture of phenolate solution and liquid solvent material selected from a group consisting of solvent material immiscible with the phenolate solution and solvent partially miscible with said phenolate solution, said solvent having a solvent action on phenol and having a boiling range substantially different from that of the phenol of the said phenolate in its uncombined state, forming an emulsion of the immiscible liquids thus agitated, permitting separation of the resulting immiscible liquids into layers and withdrawing the layer comprising liquid solvent and uncombined tar acid material.

12. In a process for extracting tar acid material from phenolate solution, agitating a mixture of phenolate solution and a liquid solvent mixture at least one component of which comprises solvent material selected from a group consisting of solvent material immiscible with the phenolate solution and solvent material partially or wholly miscible with said phenolate solution, the solvents in said solvent mixture having a solvent action on phenol and having boiling ranges substantially different from that of the phenolic material of the said phenolate in its uncombined state, forming an emulsion of the immiscible liquids thus agitated, permitting separation of the resulting immiscible liquids into layers and withdrawing the layer comprising liquid solvent and uncombined tar acid material.

13. In a process for extracting tar acid material from phenolate solution, contacting a phenolate solution and a liquid solvent mixture at least one component of which comprises solvent material selected from a group consisting of solvent material immiscible with the phenolate solution and solvent material partially or wholly miscible with said phenolate solution, the solvents in said solvent mixture having a solvent action on phenol and having boiling ranges substantially different from that of the phenolic material of the said phenolate in its uncombined state, removing free phenolic material from said phenolate solution by means of said solvent mixture, and separating from the solvent for said phenolate the resulting immiscible solution of free phenolic material.

14. In a process for extracting tar acid material from phenolate solution, treating said phenolate solution to increase hydrolysis of the phenolate, agitating a mixture of the treated phenolate solution and liquid solvent selected from a group consisting of solvent material immiscible with the phenolate solution and solvent material partially miscible with the phenolate solution, the said solvent material having a solvent action on phenol and having a boiling range substantially different from that of the phenolic material of the said phenolate in its uncombined state, forming an emulsion of the immiscible liquids thus agitated, thereby causing the phenolic material freed by hydrolysis to be dissolved in said solvent material, permitting separation of the resulting immiscible liquids into layers and withdrawing the layer comprising said liquid solvent and uncombined phenolic material.

15. In a process for extracting tar acid material from phenolate solution, treating acid phenolate solution to increase hydrolysis of the phenolate, bringing together and agitating the treated phenolate solution and a liquid solvent mixture at least one component of which comprises solvent material selected from a group consisting of solvent material immiscible with the the phenolate solution and solvent material partially or wholly miscible with said phenolate solution, the solvents in said solvent mixture having a solvent action on phenol and having boiling ranges substantially different from that of the uncombined phenolic material, forming an emulsion of the immiscible liquids thus agitated, thereby causing the phenolic material freed by hydrolysis to be dissolved in said solvent mixture, permitting separation of the resulting immiscible liquids into layers and withdrawing the layer containing uncombined phenolic material separated from the phenolate.

16. In a process for extracting tar acid material from phenolate solution, heating the phenolate solution to increase hydrolysis of the phenolate, bringing together at increased temperature the phenolate solution and liquid solvent selected from a group consisting of solvent material immiscible with the phenolate solution and solvent material partially miscible with the phenolate solution, the said solvent material having a solvent action on phenol and having a boiling range substantially different from that of the uncombined phenolic material, forming an emulsion of the mixed liquids, thereby causing the phenolic material freed by hydrolysis to be dissolved in said solvent material, permitting a separation of the resulting immiscible liquids into layers and withdrawing the layer comprising said liquid solvent and uncombined phenolic material.

17. In a process for extracting tar acid material from phenolate solution, diluting the phenolate solution to increase hydrolysis of the phenolate, bringing together the treated phenolate solution, and liquid solvent selected from a group consisting of solvent material immiscible with the phenolate solution and solvent material partially miscible with the phenolate solution, the said solvent material having a solvent action on phenol and having a boiling range substantially different from that of the phenolic material of the said phenolate in its uncombined state, forming an emulsion of the mixed liquids, thereby causing the phenolic material freed by hydrolysis to be dissolved in said solvent material, permitting separation of the resulting immiscible liquids into layers and withdrawing the layer comprising said liquid solvent and uncombined phenolic material.

18. In a process for extracting tar acid material from phenolate solution, diluting and heating the phenolate solution to increase hydrolysis of the phenolate, bringing together the treated phenolate solution, and liquid solvent selected from a group consisting of solvent material immiscible with the phenolate solution and solvent material partially miscible with the phenolate solution, the said solvent material having a solvent action on phenol and having a boiling range substantially different from that of the phenolic material of the said phenolate in its uncombined state, forming an emulsion of the mixed liquids, thereby causing the phenolic material freed by hydrolysis to be dissolved in said solvent material, permitting separation of the resulting immiscible liquids into layers and withdrawing the layer comprising said liquid solvent and uncombined phenolic material.

19. A process comprising removing phenolic material from hydrocarbon oil containing the same by means of a solution of alkaline material to form phenolate solution, contacting the said phenolate solution and a mixture of liquid solvents comprising at least two solvents selected from a group consisting of solvent material immiscible with the phenolate solution and solvent material partially or wholly miscible with said phenolate solution, the solvent constituents having a solvent action on phenol and having boiling ranges substantially different from those of the constituents of the phenolic material of the said phenolate in its uncombined state, removing free phenolic material by means of said mixture of solvents from said phenolate solution and continuing the removal until a major portion of the phenolate has been converted into uncombined phenolic material, separating from the solvent for said phenolate the solution of free phenolic material thus formed, and separating the phenol solvent from the solution of phenol material by fractional distillation.

20. A process comprising removing phenolic material from hydrocarbon oil containing the same by means of a solution of alkaline material to form phenolate solution, contacting the said phenolate solution and a mixture of liquid solvents comprising at least two solvents selected from a group consisting of solvent material immiscible with the phenolate solution and solvent material partially or wholly miscible with said phenolate solution, the solvent constituents having a solvent action on phenol and having boiling ranges substantially different from those of the constituents of the phenolic material of the said phenolate in its uncombined state, removing free phenolic material by means of said mixture of solvents from said phenolate solution and continuing the removal until a major portion of the phenolate has been converted into uncombined phenolic material, separating from the alkaline solution thus regenerated the solution of free phenolic material in said solvent mixture, and re-using regenerated alkaline solution for removing additional phenolic material from hydrocarbon oil containing the same.

21. A process comprising maintaining a body of solvent-containing material in liquid form having a solvent action on phenol, passing alkali metal phenolate solution through said solvent with which said solution is immiscible or partially miscible thereby extracting phenol material from the said phenolate solution, continuously withdrawing phenolic solution from said body of solvent-containing material, continuously maintaining the body by introducing fresh solvent material and continuously withdrawing resulting attenuated phenolate solution.

22. A process comprising bringing together in an extraction zone solvent-containing material having a solvent action on phenol and alkali metal phenolate solution with which said solvent is immiscible or partially miscible, extracting phenolic material with said solvent-containing material, and bringing additional solvent-containing material and phenolate solution into said extraction zone while withdrawing attenuated phenolate solution from said zone.

23. A process comprising maintaining a column of solvent-containing material in liquid form adapted to dissolve phenols from phenolate solution, said solvent being immiscible or partially miscible with said phenolate solution and having a boiling range substantially different from the boiling ranges of phenols of the said phenolates in their uncombined state, introducing alkali metal phenolate solution into said column of solvent adjacent the top thereof, permitting the phenolate solution to pass downwardly through said column of solvent whereby phenol is extracted by said solvent, withdrawing from the bottom of the column the resulting solution from which phenol has been extracted, introducing fresh solvent into said column adjacent the bottom thereof, and withdrawing solvent containing phenol from the column adjacent the top thereof.

24. A process comprising removing phenolic material from hydrocarbon oil containing the same by means of a solution of alkaline alkali metal compound to form alkali metal phenolate solution, contacting the said phenolate solution and ether in liquid form, removing free phenolic material from said phenolate solution by means of said ether, and continuing the removal until a major portion of the phenolate has been converted into uncombined phenolic material abstracted by the ether, and separating the solution of phenolic material in ether from the attenuated phenolate solution.

25. A process comprising removing phenolic material from hydrocarbon oil containing the same by means of a solution of alkaline alkali metal compound to form alkali metal phenolate solution, contacting the said phenolate solution and benzene in liquid form, removing free phenolic material from said phenolate solution by means of said benzene, and continuing the removal until a major portion of the phenolate has been converted into uncombined phenolic material abstracted by the benzene, and separating the solution of phenolic material in benzene from the attenuated phenolate solution.

26. A process comprising removing phenolic material from hydrocarbon oil containing the same by means of a caustic soda solution to form sodium phenolate, contacting the sodium phenolate solution and liquid solvent material having a solvent action on phenol, the said solvent material being selected from a group consisting of solvent material immiscible with the sodium phenolate solution and solvent material partially miscible with the sodium phenolate solution, removing free phenolic material from said sodium phenolate solution by means of said solvent material, and continuing the removal until a major portion of the sodium phenolate has been converted into uncombined phenol material abstracted by the solvent material, and separating the solution of phenol material from the attenuated sodium phenolate solution.

27. A process comprising removing phenolic material from hydrocarbon oil containing the same by means of a solution of caustic soda having a normality of up to approximately 5.0, contacting the sodium phenolate solution thus formed and liquid solvent material having a solvent action on phenol, the said solvent material being selected from a group consisting of solvent material immiscible with the sodium phenolate solution and solvent material partially miscible with the sodium phenolate solution, removing free phenolic material from said sodium phenolate solution by means of said solvent material, and continuing the removal until a major portion of the sodium phenolate has been converted into uncombined phenol material abstracted by the solvent material, and separating the solution of phenol material from the attenuated sodium phenolate solution.

28. A process comprising removing phenolic material from hydrocarbon oil containing the same by means of a solution of caustic soda having a normality of substantially 2.5, contacting the sodium phenolate solution thus formed and liquid solvent material having a solvent action on phenol, the said solvent material being selected from a group consisting of solvent material immiscible with the sodium phenolate solution and solvent material partially miscible with the sodium phenolate solution, removing free phenolic material from said sodium phenolate solution by means of said solvent material, and continuing the removal until a major portion of the sodium phenolate has been converted into uncombined phenol material abstracted by the solvent material, and separating the solution of phenol material from the attenuated sodium phenolate solution.

29. A process comprising contacting phenolate solution and liquid solvent material having a solvent action on phenol, the said solvent material being selected from a group consisting of solvent material immiscible with said phenolate solution and solvent material partially miscible with said phenolate solution, subjecting the phenolate solution and solvent material to superatmospheric pressure while in contact with each other, releasing the pressure on the resulting mixture and separating therefrom a solution of uncombined phenolic material in said solvent material.

30. A process comprising removing phenolic material from hydrocarbon oil containing the same by means of a caustic soda solution to form sodium phenolate, contacting the sodium phenolate solution and solvent material having a solvent action on phenol, the said solvent material comprising a mixture of liquid solvents one of which is partially or wholly miscible with the phenolate solution, removing free phenolic material from said sodium phenolate solution by means of said solvent material, and continuing the removal until a major portion of the sodium phenolate has been converted into uncombined phenol material abstracted by the solvent material, and separating the solution of phenol material from the attenuated sodium phenolate solution.

31. A process comprising removing phenolic material from hydrocarbon oil containing the same by means of a solution of caustic soda having a normality of up to approximately 5.0, contacting the sodium phenolate solution thus formed and solvent material having a solvent action on phenol, the said solvent material comprising a mixture of liquid solvents one of which is partially or wholly miscible with the phenolate solution, removing free phenolic material from said sodium phenolate solution by means of said solvent material, and continuing the removal until a major portion of the sodium phenolate has been converted into uncombined phenol material abstracted by the solvent material, and separating the solution of phenol material from the attenuated sodium phenolate solution.

32. A process comprising removing phenolic material from hydrocarbon oil containing the same by means of a solution of caustic soda having a normality of substantially 2.5, contacting the sodium phenolate solution thus formed and solvent material having a solvent action on phenol, the said solvent material comprising a mixture of liquid solvents one of which is partially or wholly miscible with the phenolate solution, removing free phenolic material from said phenolate solution by means of said solvent material, and continuing the removal until a major portion of the sodium phenolate has been converted into uncombined phenol material abstracted by the solvent material, and separating the solution of phenol material from the attenuated sodium phenolate solution.

33. A process comprising contacting phenolate solution and solvent material having a solvent action on phenol, the said solvent material comprising a mixture of liquid solvents one of which is partially or wholly miscible with the phenolate solution, subjecting the phenolate solution and solvent material to superatmospheric pressure while in contact with each other, releasing the pressure on the resulting mixture and separating therefrom a solution of uncombined phenolic material in said solvent material.

ERNEST B. KESTER.